(12) United States Patent
Kumakura et al.

(10) Patent No.: US 11,211,894 B2
(45) Date of Patent: Dec. 28, 2021

(54) ELECTRIC TOOL

(71) Applicant: Koki Holdings Co., Ltd., Tokyo (JP)

(72) Inventors: Takeru Kumakura, Ibaraki (JP);
Hideyuki Tanimoto, Ibaraki (JP);
Takuya Yoshinari, Ibaraki (JP); Shinji Kuragano, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 123 days.

(21) Appl. No.: 16/608,864

(22) PCT Filed: Mar. 30, 2018

(86) PCT No.: PCT/JP2018/013675
§ 371 (c)(1),
(2) Date: Oct. 28, 2019

(87) PCT Pub. No.: WO2018/198673
PCT Pub. Date: Nov. 1, 2018

(65) Prior Publication Data
US 2021/0119566 A1    Apr. 22, 2021

(30) Foreign Application Priority Data

Apr. 28, 2017  (JP) .............................. JP2017-090110

(51) Int. Cl.
*H02P 29/40* (2016.01)
*B23D 47/12* (2006.01)

(52) U.S. Cl.
CPC .............. *H02P 29/40* (2016.02); *B23D 47/12* (2013.01)

(58) Field of Classification Search
CPC ................................. H02P 29/40; B23D 47/12
(Continued)

(56) References Cited

U.S. PATENT DOCUMENTS 6,995,679 B2 * 2/2006 Eskritt .................. B62D 5/065
340/686.1
7,821,217 B2 * 10/2010 Abolhassani ....... H02P 21/0089
318/432
(Continued)

FOREIGN PATENT DOCUMENTS

JP      2011230272      11/2011
JP      2015027710      2/2015
(Continued)

OTHER PUBLICATIONS

"International Search Report (Form PCT/ISA/210)" of PCT/JP2018/013675, dated Jun. 26, 2018, with English translation thereof, pp. 1-4.

*Primary Examiner* — David Luo
(74) *Attorney, Agent, or Firm* — JCIPRNET (57) ABSTRACT

Provided is an electric tool capable of continuing work by making the electrical advance angle of a brushless motor changeable even when a load is heavy. The electric tool is provided with: a brushless motor; a controller for controlling the drive of the brushless motor; and an inverter circuit supplied with a pulsation voltage obtained by rectifying an AC power supply input in a full-wave manner and electrifying the brushless motor 1 according to a control signal of the controller. The controller can change the electrical advance angle of the brushless motor. The controller detects the motor current flowing through the brushless motor and increases the electrical advance angle when the motor current reaches a predetermined threshold value.

12 Claims, 11 Drawing Sheets

(58) Field of Classification Search
USPC .................................................. 318/3, 17, 34
See application file for complete search history.

(56) References Cited

U.S. PATENT DOCUMENTS

| | | | | |
|---|---|---|---|---|
| 9,276,509 B2* | 3/2016 | Kato | .......................... | H02P 6/15 |
| 9,621,081 B2* | 4/2017 | Kawai | ...................... | H02P 27/08 |

FOREIGN PATENT DOCUMENTS

| | | |
|---|---|---|
| JP | 2015037822 | 2/2015 |
| WO | 2012108415 | 8/2012 |
| WO | 2016158131 | 10/2016 |
| WO | 2016194535 | 12/2016 |

* cited by examiner

ELECTRIC TOOL

CROSS-REFERENCE TO RELATED APPLICATION

This application is a 371 application of the International PCT application serial no. PCT/JP2018/013675, filed on Mar. 30, 2018, which claims the priority benefit of Japan Patent Application No. 2017-090110, filed on Apr. 28, 2017. The entirety of each of the abovementioned patent applications is hereby incorporated by reference herein and made a part of this specification.

BACKGROUND

Technical Field

The invention relates to an electric tool using a commercial AC power supply, and more particularly, to an electric tool using a brushless motor as a drive source.

Description of Related Art

For an electric tool using a commercial AC power supply, a configuration is known in which a smoothing capacitor between a rectifier circuit for rectifying the commercial AC power supply input and an inverter circuit is omitted or the size is reduced as a small capacity, and a pulsation voltage is supplied to a brushless motor (Patent Document 1: WO2016/158131).

SUMMARY

Problems to be Solved

In the case of the electric tool as described in Patent Document 1, in order to limit the amount of current flowing into the motor, an overcurrent protection function is provided to detect the peak value of the motor current and stop electrification of the motor when the peak value reaches a predetermined value. For this reason, overcurrent protection is activated by the motor peak current which occurs at the time of a heavy load and interrupts the operation, and the cutting surface of a cutting tool such as a circular saw may be uneven, which may adversely affect completion of the work.

The invention has been made in recognition of such a situation and aims to provide an electric tool capable of continuing the operation even at the time of a heavy load by making the electrical advance angle of the brushless motor variable.

Means for Solving the Problems

The first aspect of the invention is an electric tool. The electric tool includes: a brushless motor; a housing that accommodates the brushless motor; a controller that controls drive of the brushless motor; and an inverter circuit that receives supply of a pulsation voltage obtained by full-wave rectifying an AC power supply input and electrifies the brushless motor according to a control signal of the controller. The controller is capable of changing an electrical advance angle of the brushless motor, and the controller detects a load on the brushless motor and increases the electrical advance angle when the load increases.

The second aspect of the invention is also an electric tool. The electric tool includes: a brushless motor; a housing that accommodates the brushless motor; a controller that controls drive of the brushless motor; and an inverter circuit that receives supply of a pulsation voltage obtained by full-wave rectifying an AC power supply input and electrifies the brushless motor according to a control signal of the controller. The controller is capable of changing an electrical advance angle of the brushless motor through a manual switching part.

In the first aspect, the electrical advance angle may be switched gradually or instantaneously.

In the first aspect, if the electrical advance angle of the brushless motor is $\theta$ and a number of rotor magnetic poles of the brushless motor is P, in a case where the motor current reaches a predetermined threshold value, the electrical advance angle may be increased within a range satisfying $\theta < 360°/P$.

In the first aspect, in a case where the brushless motor is a three-phase brushless motor and the number P of the rotor magnetic poles is four, when the motor current reaches the predetermined threshold value, the electrical advance angle $\theta$ may be set to $60° \leq \theta < 90°$.

In the first or second aspect, the brushless motor may drive rotation of a circular saw blade.

The controller may determine a magnitude of the load according to a current flowing through the brushless motor.

The controller may increase the electrical advance angle when the load exceeds a threshold value.

It should be noted that any combination of the above-described constituent elements and those obtained by converting the expression of the invention among methods and systems are also effective as the aspects of the invention.

Effects

According to the electric tool of the invention, it is possible to continue the operation even at the time of a heavy load by making the electrical advance angle of the brushless motor variable.

BRIEF DESCRIPTION OF THE DRAWINGS

FIG. 7A and FIG. 7B are motor current waveforms in the embodiment, where

DESCRIPTION OF THE EMBODIMENTS

Hereinafter, preferred embodiments of the invention will be described in detail with reference to the drawings. The same or equivalent component, member, process, etc. shown in the drawings will be labeled with the same symbol, and the repeated descriptions will be omitted where appropriate. In addition, the embodiments illustrate, rather than limit, the invention, and all features described in the embodiments and combinations thereof are not necessarily essential to the invention.

Figure 1:
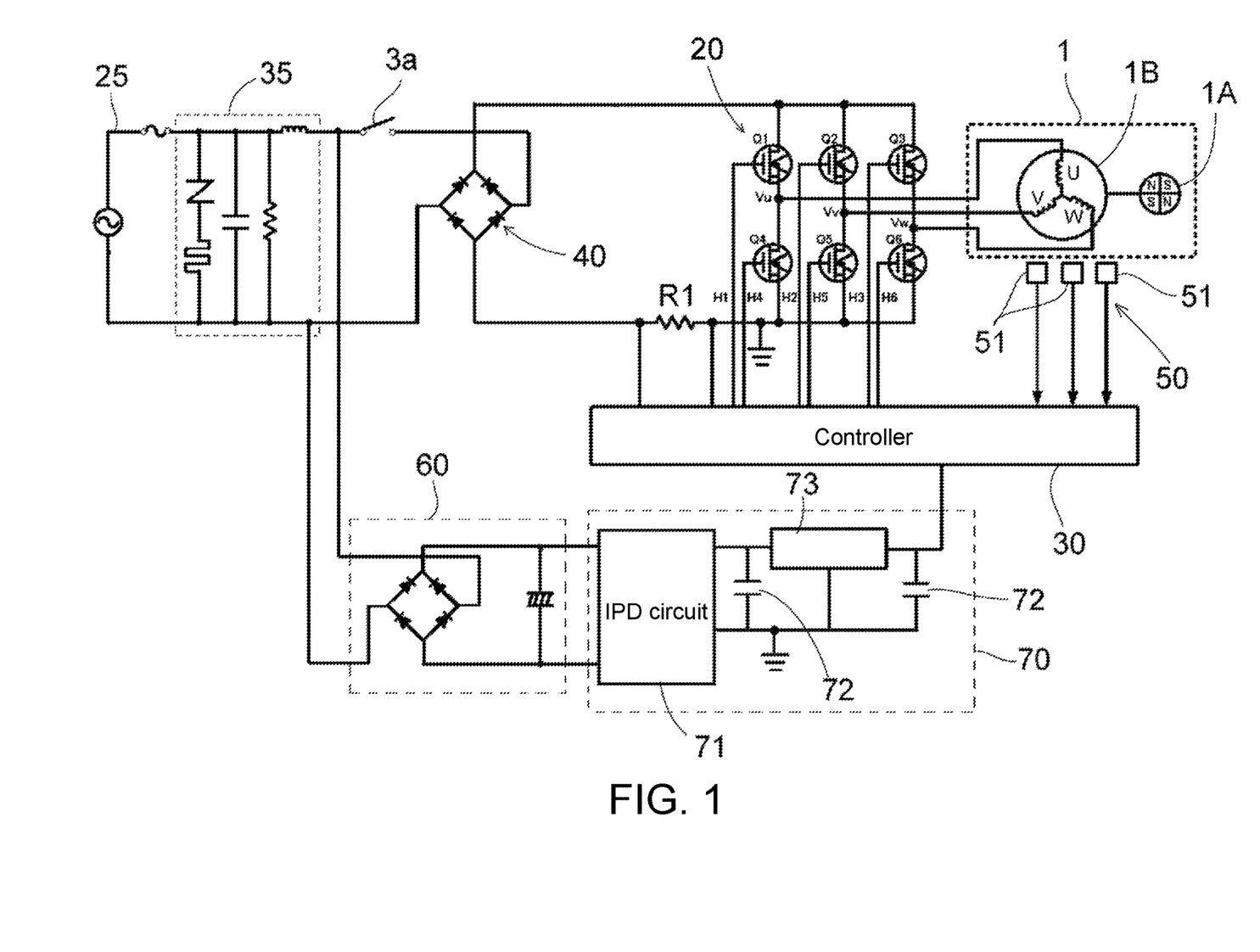
FIG. 1 is a circuit block diagram showing an embodiment of an electric tool according to the invention.
Figure 2:
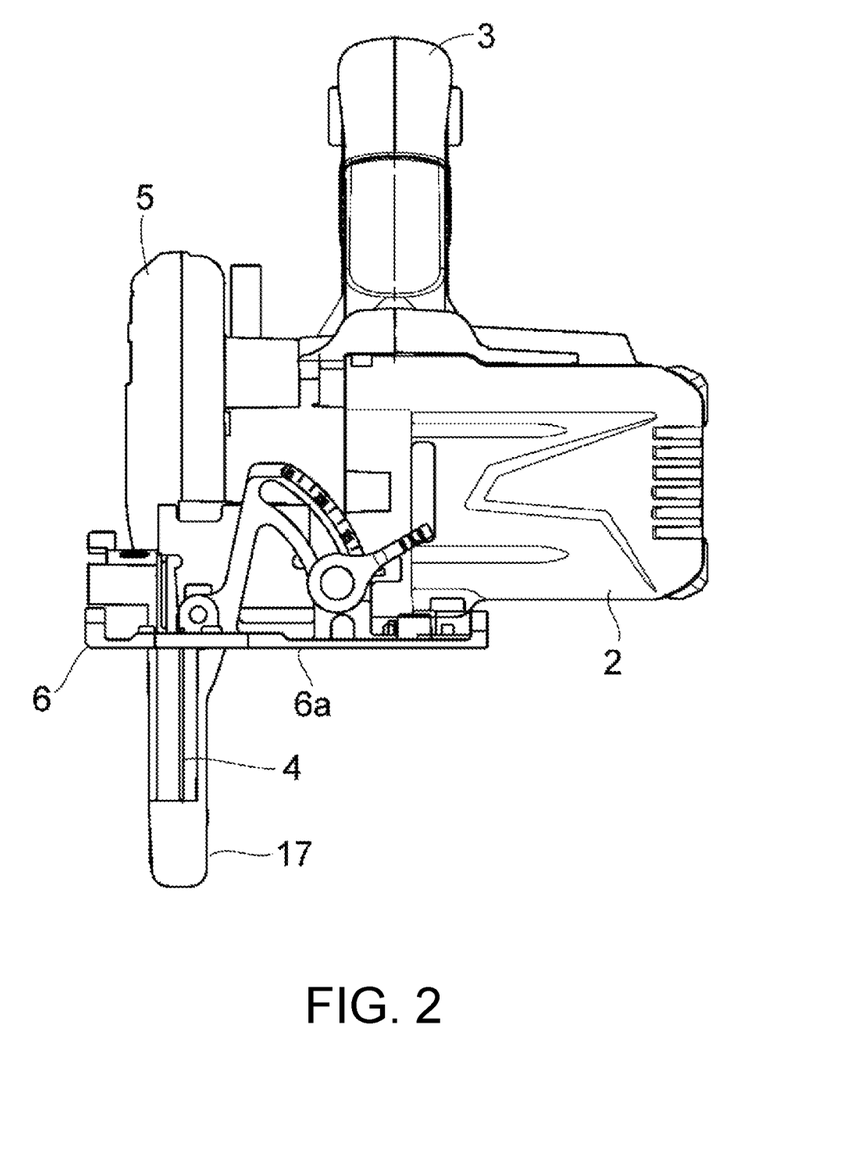
FIG. 2 is a front view of the embodiment.
Figure 3:
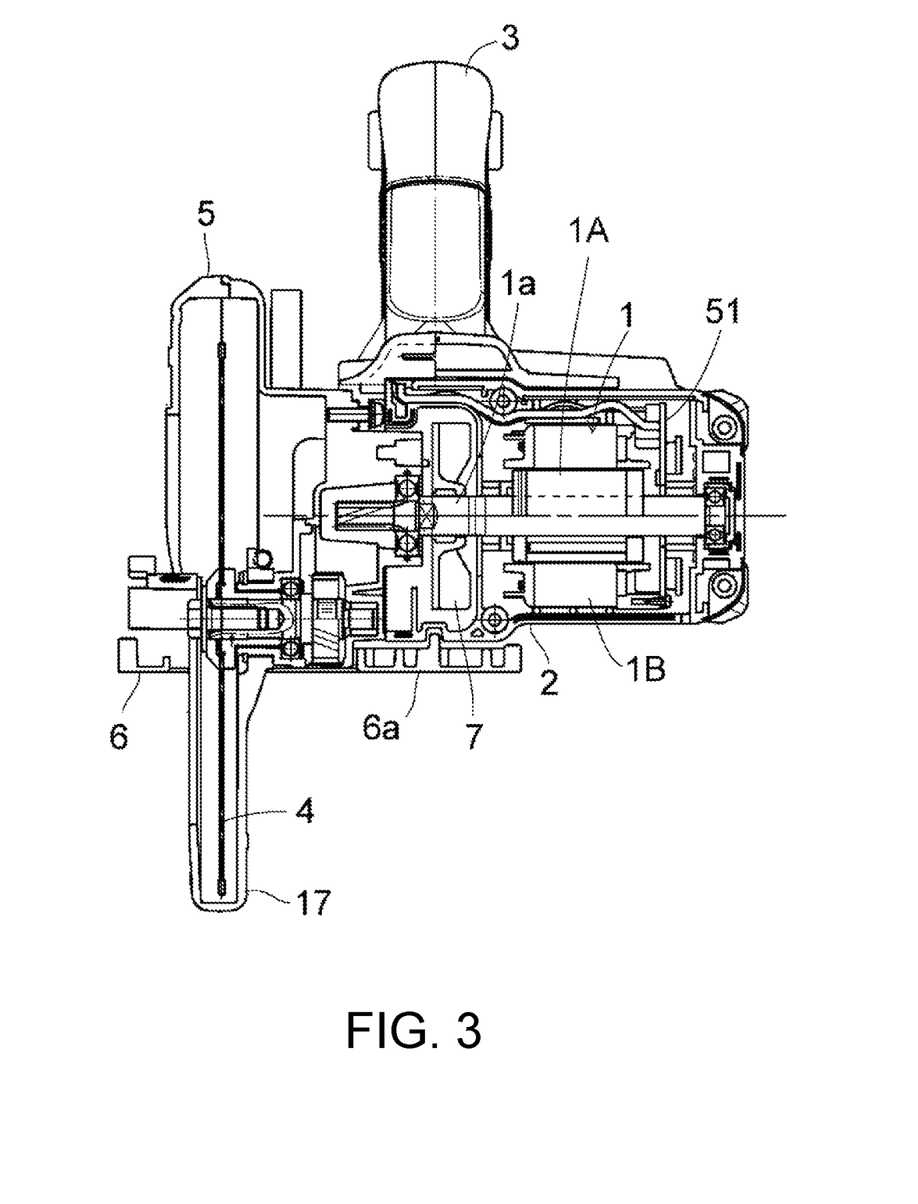
FIG. 3 is a front sectional view thereof.
Figure 4:
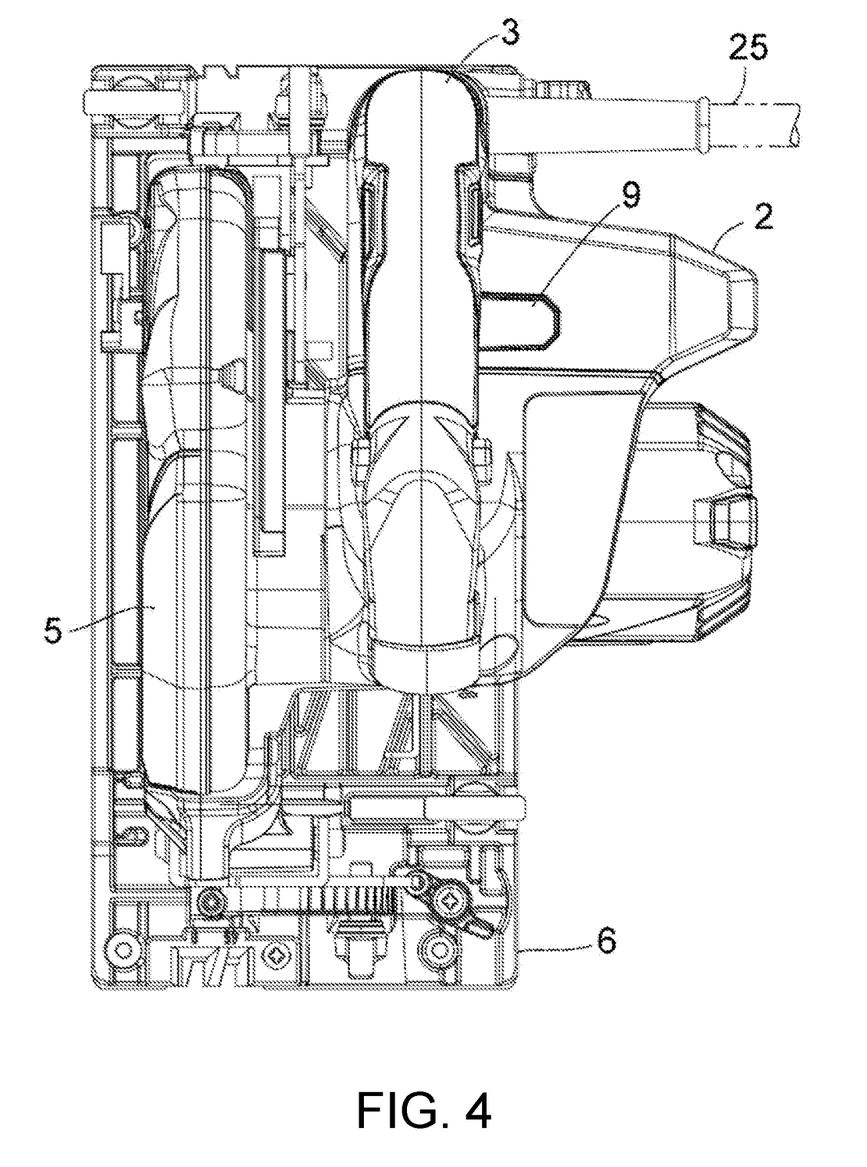
FIG. 4 is a plan view thereof.
Figure 5:
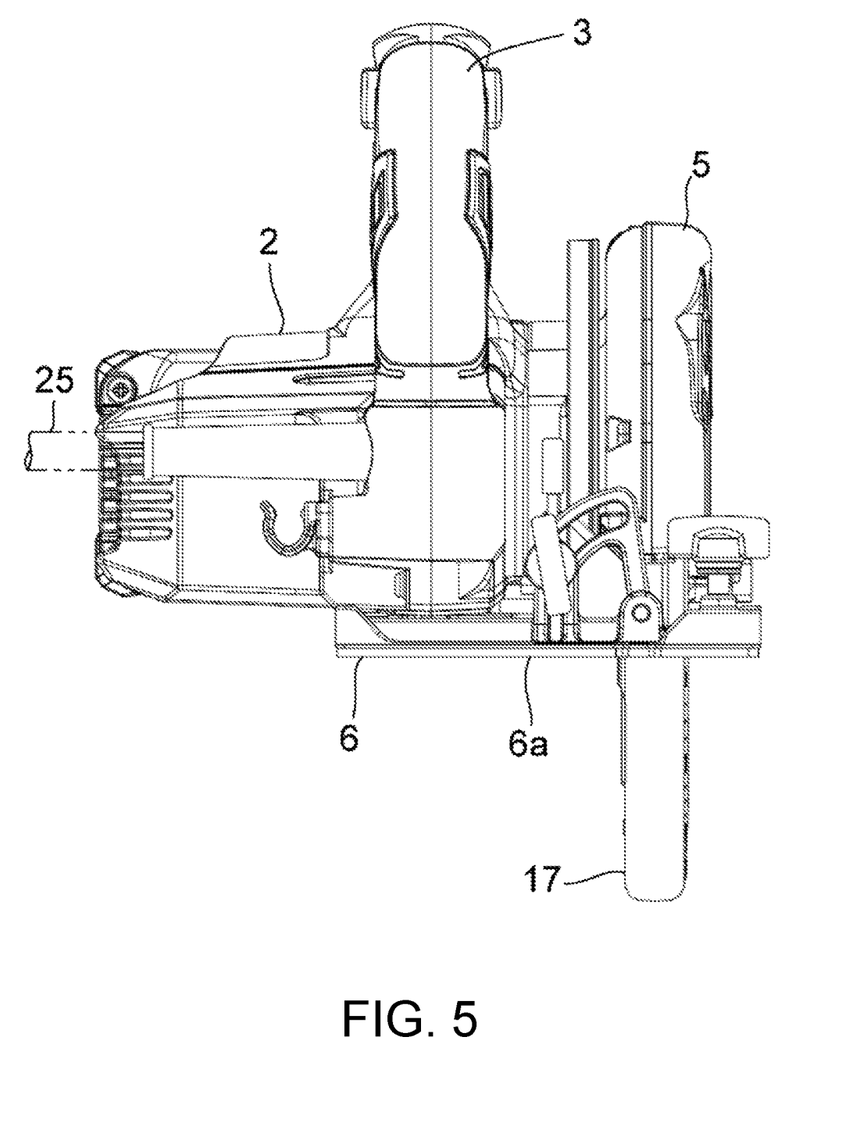
FIG. 5 is a rear view thereof.
Figure 6:
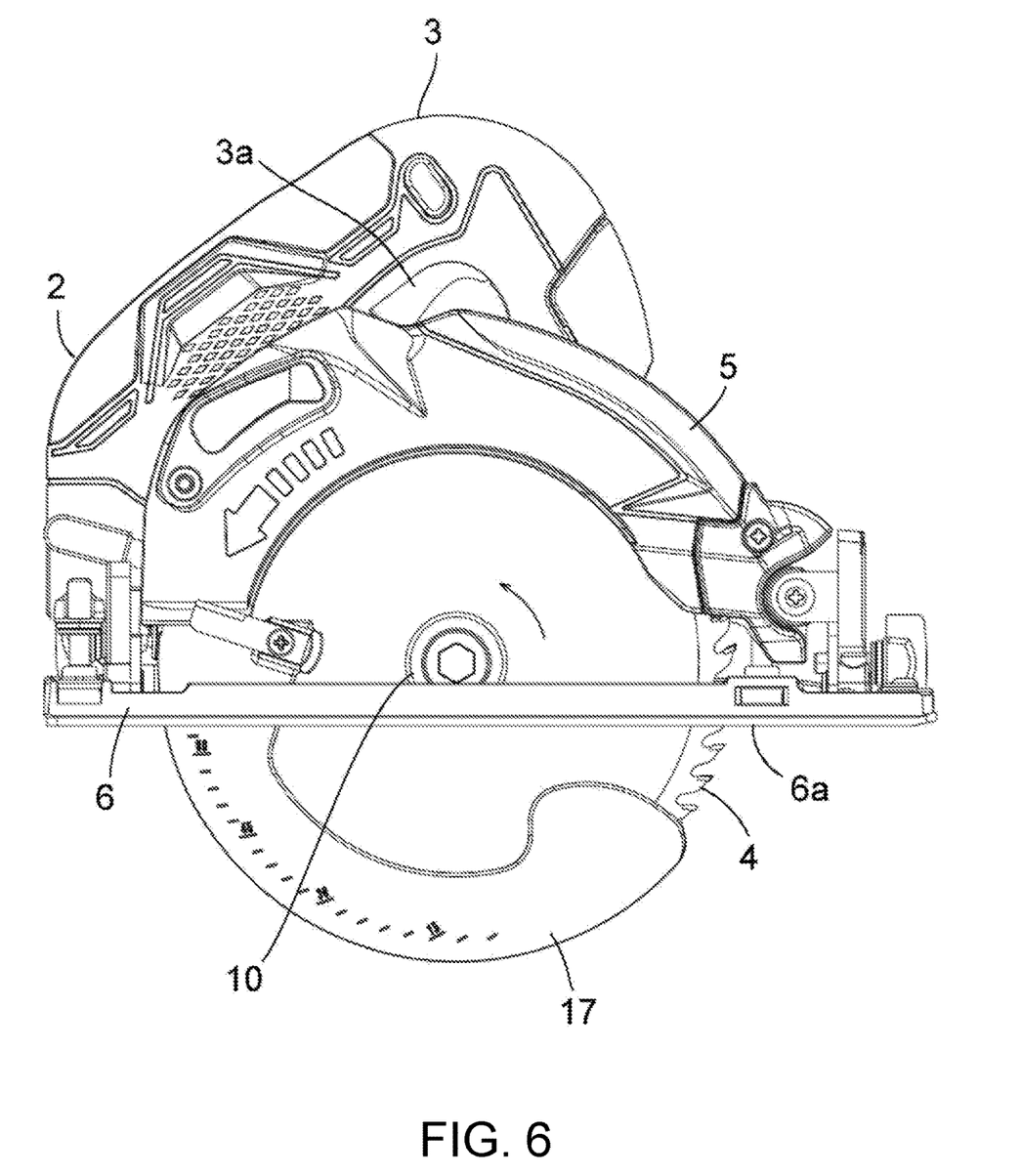
FIG. 6 is a side view thereof.

FIG. 1 is an embodiment of an electric tool according to the invention and is a circuit block diagram of a corded portable electric circular saw which receives power from an external AC commercial power supply (AC100V commercial power supply); FIG. 2 is a front view of the portable electric circular saw; FIG. 3 is a front sectional view thereof for showing the internal structure; FIG. 4 is a plan view thereof; FIG. 5 is a rear view thereof; and FIG. 6 is a side view thereof. Here, first, the structure of the portable electric circular saw in the embodiment will be described with reference to FIG. 2 to FIG. 6.

In FIG. 2 to FIG. 6, the portable electric circular saw includes: a housing 2 which accommodates a brushless motor 1; a handle 3 integrally provided with the housing 2 for an operator to hold; a circular saw blade 4 rotationally driven by the motor 1; a saw cover 5 which is attached to the housing 2, has a shape covering the substantially upper half of the outer circumference of the circular saw blade 4, and houses part of the outer circumference of the circular saw blade 4 and part of a side surface of the circular saw blade 4 on the motor 1 side; a base 6 which is connected to the housing 2 via the saw cover 5, has a bottom surface 6a slidable on a material to be cut such as wood, and has an opening part through which the circular saw blade 4 can protrude downward from the bottom surface 6a; and a centrifugal fan 7 which is fixedly provided at an output shaft 1a of the motor 1, rotates by driving of the motor 1, and cools the motor 1 with the fan wind generated during rotation. As shown in FIG. 6, the handle 3 is provided with a switch 3a for switching between operation start and stop of the portable electric circular saw.

The portable electric circular saw is provided with a safety cover 17 having a shape substantially covering half of the outer circumference of the circular saw blade 4. The safety cover 17 is held in the saw cover 5 to be turnable coaxially with a drive shaft 10 of the circular saw blade 4 and may be housed in the saw cover 5. The safety cover 17 is urged by an urging part such as a spring (not shown), and a turning position at which most part protrudes below the bottom surface 6a of the base 6 to prevent the outer circumference of the circular saw blade 4 from being exposed becomes the initial state. During a cutting operation, the front end part of the safety cover 17 in the cutting direction (the right side of FIG. 6) contacts the end part of the material to be cut. By sliding the portable electric circular saw in the cutting direction in this state, the safety cover 17 is turned against the spring to be housed in the saw cover 5, and the circular saw blade 4 is exposed on the bottom surface 6a of the base 6. In the case of a window cutout operation or the like in which a cutting process in which the end face is not continuous is performed on the upper surface of the material to be cut, an operator may turn the safety cover 17 by a lever operation or the like to expose the circular saw blade 4 on the bottom surface 6a of the base 6. The drive shaft 10 to which the circular saw blade 4 is attached and fixed is linked with the output shaft 1a of the motor 1 via a gear mechanism. As shown in FIG. 4, a power cord 25 for connecting to the external AC commercial power supply is drawn from the rear part of the housing 2.

The saw cover 5 as described above is connected to the base 6 so as to interpose the circular saw blade 4 in the vicinity of two end sides in the longitudinal direction of the base 6. Although the details are omitted, a mechanism for adjusting the protruding amount of the circular saw blade 4 from the bottom surface of the base 6 by a lever operation or the like and a mechanism for tilting the rotation plane of the circular saw blade 4 with respect to the base 6 (i.e., tilting the housing 2 with respect to the base 6) are provided.

As described above, the portable electric circular saw uses an AC commercial power supply and has a circuit configuration shown in FIG. 1 for controlling start and rotation of the brushless motor 1, i.e., having the following in the housing 2: an inverter circuit 20 which includes switching elements for switching power supplied to the brushless motor 1; a controller (control circuit) 30 for controlling the same; a full-wave rectifier (diode bridge) 40 which receives an AC power supply (AC 100V commercial power supply) input from the power cord 25 drawn from the rear face of the housing 2 via a filter circuit 35 and converts it into a pulsation voltage (full-wave rectified waveform voltage) for driving the brushless motor; and a rotation state detecting part 50 which generates a signal according to the rotation position of the brushless motor 1. In addition, as a power supply for driving the controller 30, a rectifying and smoothing circuit 60 for rectifying and smoothing the AC power supply input and a constant voltage circuit 70 for stepping down and stabilizing the DC output voltage are provided in the housing 2. The constant voltage circuit 70 is formed by including an IPD circuit 71, a capacitor 72, and a regulator 73, and supplies the stabilized driving DC voltage to the controller 30.

The brushless motor 1 of FIG. 1 has a rotor 1A, a stator 1B, and a sensor magnet (not shown) integrated with the rotor 1A. The rotor 1A has four magnetic poles on the outer circumference surface, the stator 1B has star-connected stator windings U, V, and W, and the brushless motor 1 is a three-phase brushless motor.

The AC power supply input is full-wave rectified by the full-wave rectifier 40 to be a pulsation voltage (full-wave rectified waveform voltage) and supplied to the inverter circuit 20. The inverter circuit 20 includes six switching elements Q1 to Q6 such as FETs connected in a three-phase bridge form. Control signals H1 to H6 from the controller 30 are respectively applied to the gates of the six bridge-connected switching elements Q1 to Q6, the drains or sources of the six switching elements Q1 to Q6 are connected to the star-connected stator windings U, V, and W of the motor 1. The six switching elements Q1 to Q6 perform switching operations according to the control signals H1 to H6, and supplies power to the stator windings U, V, and W by using the pulsation voltage supplied to the inverter circuit 20 as three-phase (U-phase, V-phase, and W-phase) voltages Vu, Vv, and Vw to start and rotate the brushless motor 1. A motor current detection resistor R1 is inserted in the negative side electrification path of the inverter circuit 20, and the controller 30 detects the motor current from the voltage drop across the two ends of the detection resistor R1. The controller 30 includes, for example, a microcomputer.

The rotation state detecting part 50 has a rotation position detecting element 52 (e.g., a hall element) disposed on a substrate 51 of FIG. 3 to face the sensor magnet integrated with the rotor 1A of the motor 1 (however, the rotation position detecting element 52 is omitted in FIG. 3). As shown in FIG. 3, the substrate 51 is disposed at the rear position of the motor 1 to closely face the rotor 1A integrated with the sensor magnet. In the case of a three-phase brushless motor, three rotation position detecting elements 52 are disposed at an interval of 60 degrees. The controller 30 receives a rotor position detection signal of the rotation position detecting element 52 and transmits the control signals H1 to H6 for controlling the drive of the motor 1 to the inverter circuit 20.

Generally, the rotation position detecting element 52 is arranged at a position that divides the interval between adjacent magnetic poles of the stator 1B into two equal parts to detect the reversal of the magnetic poles of the rotor 1A. In such arrangement of the rotation position detecting element 52, the electrical advance angle is 0 degrees in the case where switching of turning on the switching elements Q1 to Q6 is performed at the same timing as that when the reversal of the magnetic poles of the rotor 1A is detected by the rotation position detecting element 52, but control is performed to perform switching of turning on the switching elements Q1 to Q6 at an earlier timing, i.e., by advancing (increasing) the electrical advance angle. The PWM control may be performed by controlling the conduction period of the high-side switching elements Q1 to Q3 or the low-side switching elements Q4 to Q6 by the control signals H1 to H3 or the control signals H4 to H6 of the controller 30.

Figure 7A:
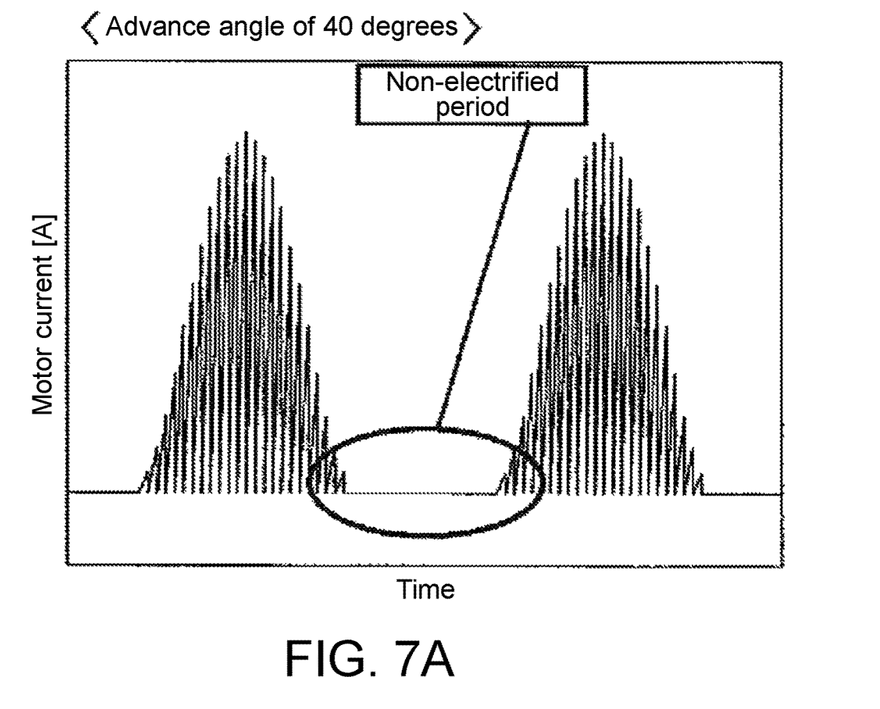
FIG. 7A is a motor current waveform diagram when the electrical advance angle is 40 degrees.

FIG. 7A shows a motor current waveform of the brushless motor 1 when the electrical advance angle is 40 degrees in the case where the full-wave rectified waveform voltage is supplied to the inverter circuit 20 as the pulsation voltage. In this case, a non-electrified period is generated due to an induced voltage of the motor 1, the motor current waveform is a sharp waveform, and the current effective value is lower than the current peak value.

Figure 7B:
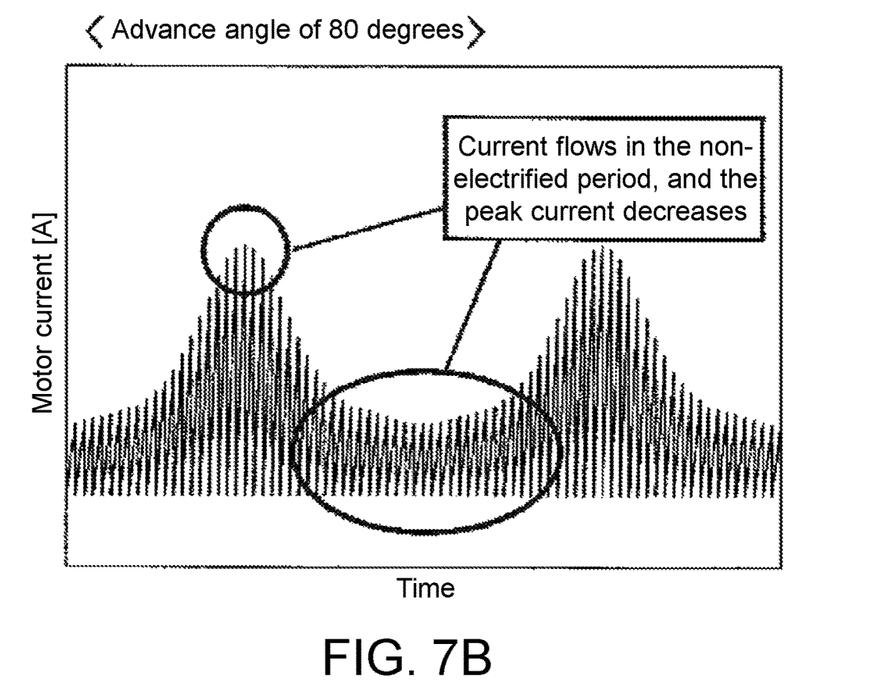
FIG. 7B is a motor current waveform diagram when the electrical advance angle is 80 degrees.

On the other hand, FIG. 7B shows a motor current waveform of the brushless motor 1 when the electrical advance angle is 80 degrees in the case where the full-wave rectified waveform voltage is similarly supplied to the inverter circuit 20. In this case, the motor current also flows in the non-electrified period of the case where the electrical advance angle is 40 degrees, the current peak value of the motor current waveform is lowered, and the current effective value is higher than that when the electrical advance angle is 40 degrees. In addition, as the electrical advance angle is increased up to an electrical advance angle of 90 degrees, the motor peak current with respect to the motor output decreases. However, when the electrical advance angle is 90 degrees or more, the current flowing in the non-electrified period becomes larger, and the effect of increasing the electrical advance angle is reduced instead.

Figure 8:
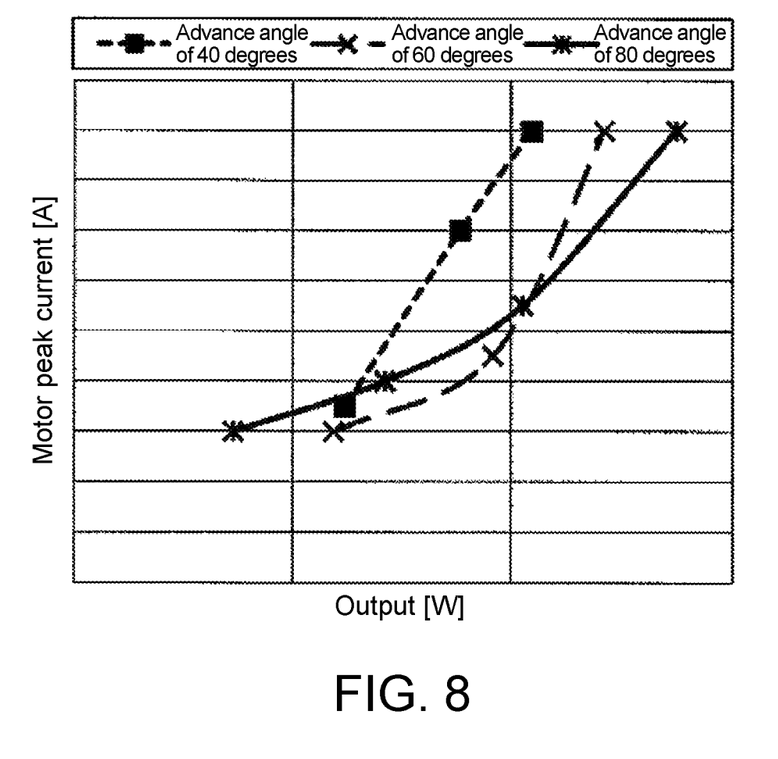
FIG. 8 is a graph showing the relationship between the motor peak current and the motor output when the electrical advance angle is 40 degrees, 60 degrees and 80 degrees.

FIG. 8 is a graph showing the relationship between the motor peak current and the motor output when the advance angle is 40 degrees, 60 degrees, and 80 degrees in the case where the maximum value of the motor peak current is limited by an overcurrent protection function, and it can be learned that the maximum value obtained of the motor output is larger at the electrical advance angle of 60 degrees than at the electrical advance angle of 40 degrees, and the maximum value obtained of the motor output is further larger at the electrical advance angle of 80 degrees than at the electrical advance angle of 60 degrees.

Figure 9:
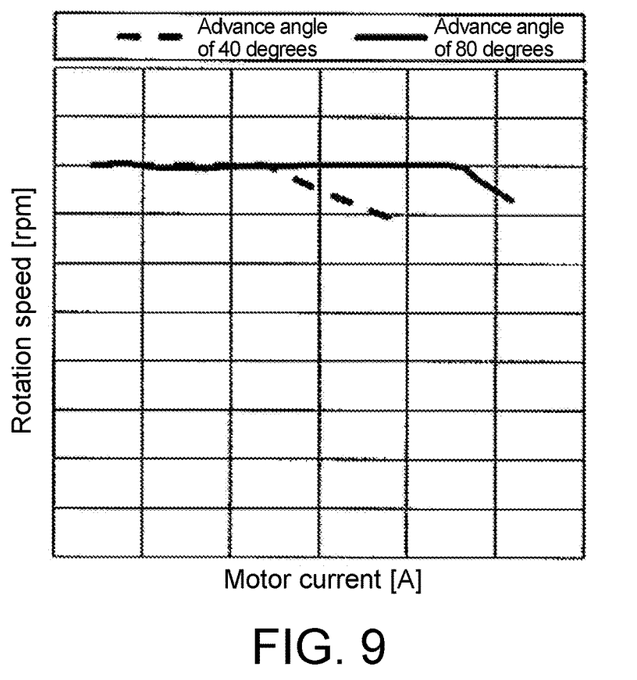
FIG. 9 is a graph showing the relationship between the motor rotation speed and the motor current when the electrical advance angle is 40 degrees and 80 degrees.

FIG. 9 is a graph showing the relationship between the motor rotation speed and the motor current when the electrical advance angle is 40 degrees and 80 degrees in the case where the brushless motor 1 is controlled at a constant speed by the controller 30, and it is possible to perform constant speed control on the motor current up to a higher range at the electrical advance angle of 80 degrees than at the electrical advance angle of 40 degrees.

Figure 10:
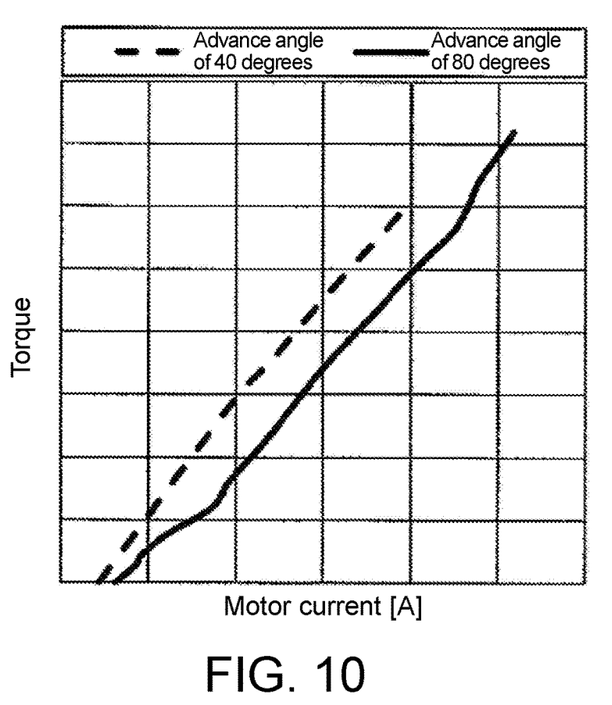
FIG. 10 is a graph showing the relationship between the motor torque and the motor current when the electrical advance angle is 40 degrees and 80 degrees.

FIG. 10 is a graph showing the relationship between the motor torque and the motor current when the electrical advance angle is 40 degrees and 80 degrees in the case where the brushless motor 1 is controlled at a constant speed by the controller 30. Although the motor current for generating the same torque may be smaller at the advance angle of 40 degrees, since the electrical advance angle of 80 degrees allows the motor current to flow to a higher range, the maximum torque can be increased at the electrical advance angle of 80 degrees.

Figure 11:
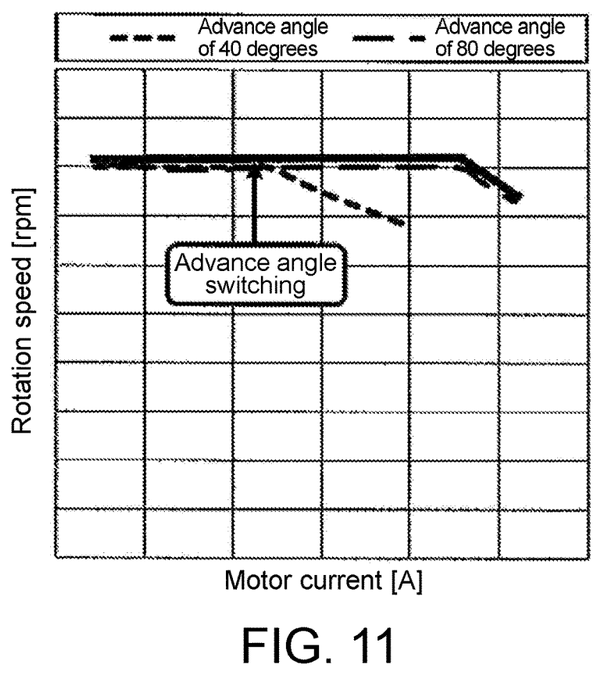
FIG. 11 is a graph showing the relationship between the motor rotation speed and the motor current in the case where the electrical advance angle is switched so as to continue the constant speed control.
Figure 12:
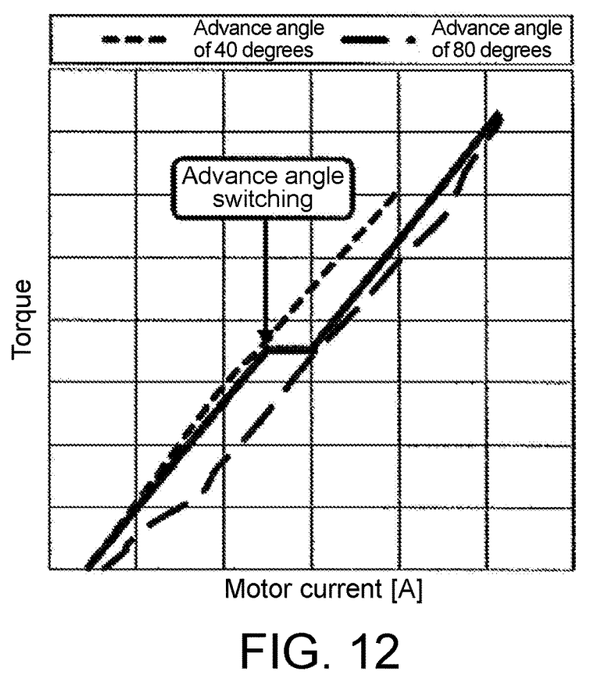
FIG. 12 is a graph showing the relationship between the motor torque and the motor current in the case where the electrical advance angle is switched so as to continue the constant speed control.

In view of the relationship between the electrical advance angle and the motor characteristics of the brushless motor 1 of FIG. 7 to FIG. 10, in the present embodiment, the controller 30 detects the motor current flowing through the brushless motor 1 and constantly monitors it, and when the motor current reaches a predetermined threshold value (a current value slightly lower than the current value at which the rotation speed starts to decrease in the case of the electrical advance angle of 40 degrees in FIG. 9), the electrical advance angle is increased to control the drive of the brushless motor 1 at the electrical advance angle of 80 degrees. As a result of such advance angle switching, as shown in FIG. 11 and FIG. 12, in the light load range, the drive of the brushless motor 1 can be controlled at the electrical advance angle of 40 degrees at which a larger torque is generated by the same motor current, and further, in the heavy load range, the drive of the brushless motor 1 can be controlled at the electrical advance angle of 80 degrees at which constant speed rotation can be maintained even at the time of a heavy load by increasing the motor current.

In the present embodiment, in addition to automatic switching of the electrical advance angle by the controller 30, the electrical advance angle may also be switched through manually operating a manual switching part by the operator. Selection of the operation modes of operation start/stop of the portable electric circular saw, automatic switching/manual switching of the electrical advance angle, etc. may be performed through an operation panel 9 of FIG. 4 provided on a handle facing surface of the housing 2.

In the portable electric circular saw shown in the above embodiment, at the time of a cutting operation, the operator holding the handle 3 starts the brushless motor 1 by turning on the switch 3a with the bottom surface 6a of the base 6 placed on the material to be cut, and while driving the circular saw blade 4 to rotate, slides the base 6 to cut the material to be cut. In the normal cutting range for the material to be cut, the controller 30 sets the electrical advance angle to 40 degrees to lower the motor current and perform efficient operation. Moreover, in the cutting range where the load is heavy, through automatically switching to the direction of increasing the electrical advance angle by the controller 30 (i.e., advancing the electrical advance angle to 80 degrees), the motor peak current is suppressed to prevent the overcurrent protection function from working, and the cutting operation is continued while preventing the occurrence of uneven cutting resulting from a motor electrification stop.

According to the present embodiment, the following effects can be achieved.

(1) The electrical advance angle of the brushless motor 1 can be changed by the controller 30, and the controller 30 is configured to detect the motor current flowing through the brushless motor 1 and, when the motor current reaches the predetermined threshold value, perform control to increase the electrical advance angle. Therefore, in the light load range, the drive can be controlled at a relatively small electrical advance angle (e.g., around 40 degrees) at which a larger torque is generated by the same motor current, and further, in the heavy load range, the drive of the brushless motor 1 can be controlled at a relatively large electrical advance angle (e.g., around 80 degrees) at which constant speed rotation can be maintained even at the time of a heavy load by increasing the motor current. For this reason, even in the case where the full-wave rectified waveform voltage obtained by rectifying the commercial AC power supply is supplied to the inverter circuit 20, by suppressing the motor peak current at the time of a heavy load, the overcurrent protection function can be prevented from working, and inconvenience resulting from a motor electrification stop can be prevented.

(2) With the operation panel 9 provided in the housing 2, the operator can also manually set the electrical advance angle in advance according to the operation content. For this reason, in the case where a heavy load is expected, the electrical advance angle can be set to around 80 degrees in advance.

(3) As the full-wave rectified waveform voltage obtained by rectifying the commercial AC power supply may be supplied to the inverter circuit 20, a large smoothing capacitor may be omitted (however, a small-capacitance capacitor may be added), and the device may be downsized.

Figure 13:
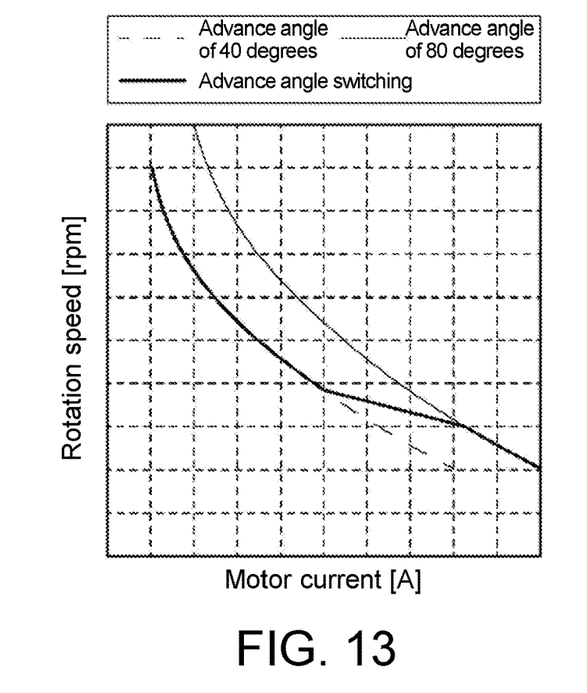
FIG. 13 is a graph showing the relationship between the motor rotation speed and the motor current in the case where the electrical advance angle is gradually switched.
Figure 14:
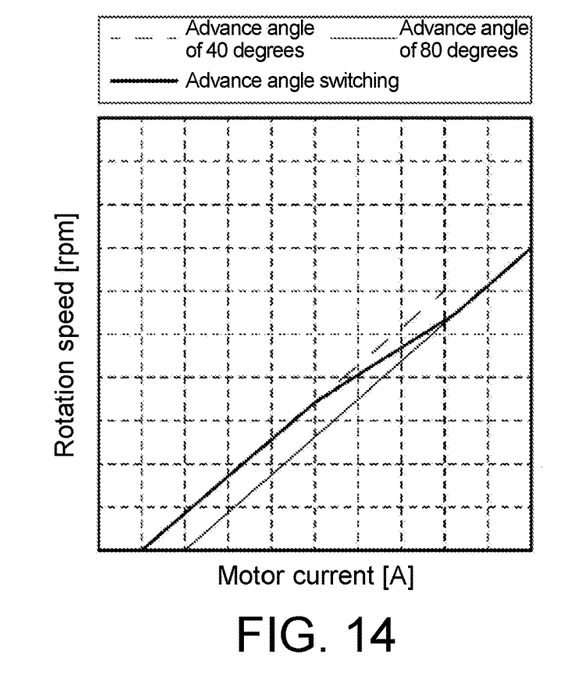
FIG. 14 is a graph showing the relationship between the motor torque and the motor current in the case where the electrical advance angle is gradually switched.

FIG. 13 and FIG. 14 show another embodiment of the invention, in which the electrical advance angle is gradually switched from 40 degrees to 80 degrees. FIG. 13 is a graph showing the relationship between the motor rotation speed and the motor current in the case where the electrical advance angle is gradually switched from 40 degrees to 80 degrees, and FIG. 14 is a graph showing the relationship between the torque and the motor current in the case where the electrical advance angle is gradually switched from 40 degrees to 80 degrees. By gradually changing the electrical advance angle, a rapid change in the motor current can be suppressed.

The invention has been described above by taking the embodiments as examples, but it will be understood by those skilled in the art that various modifications may be made to each component and each processing process of the embodiments within the scope recited in the claims. Hereinafter, modification examples will be described.

In the embodiments of the invention, a portable electric circular saw has been illustrated as an example of the electric tool, but application to a tabletop cutting machine or the like is also possible.

The electrical advance angle may be changed according to the use and the structure of the brushless motor. For example, in the case of a three-phase brushless motor of a rotor having four poles, the electrical advance angle at the time of a light load may be set to a range of 0 degrees to 45 degrees, and the electrical advance angle at the time of a heavy load may be set to a range of 45 degrees to 90 degrees which is larger than the electrical advance angle at the time of a light load.

In view of the fact based on FIG. 8 that, at the maximum value of the motor peak current, the output is larger even at the electrical advance angle of 60 degrees than at the electrical advance angle of 40 degrees, if the electrical advance angle is θ, it is also effective to set to 60°≤θ<90° at the time of a heavy load.

Furthermore, if the electrical advance angle of the brushless motor is θ and the number of rotor magnetic poles of the brushless motor is P, in the case where the motor current reaches the predetermined threshold value, the electrical advance angle may be configured to be increased within a range satisfying θ<360°/P.

Moreover, in the determination of the magnitude of the load on the motor, the determination has been made based on the magnitude of the current flowing through the motor, but a value that varies according to the load on the motor may also be used. For example, the load on the motor may also be determined according to the rotation speed of the motor.

What is claimed is:

1. An electric tool, comprising:
   a brushless motor;
   a housing that accommodates the brushless motor;
   a controller that controls drive of the brushless motor; and
   an inverter circuit that receives supply of a pulsation voltage obtained by full-wave rectifying an AC power supply input and electrifies the brushless motor according to a control signal of the controller,
   wherein a non-electrified period in which no current flows in the motor is occurred in a state that a load of the brushless motor is small,
   the controller is capable of changing an electrical advance angle of the brushless motor, and
   the controller detects the load and reduces the non-electrified period by increasing the electrical advance angle when the load increases.

2. The electric tool according to claim 1, wherein the electrical advance angle is switched gradually or instantaneously.

3. The electric tool according to claim 2, wherein when the electrical advance angle of the brushless motor is θ and a number of rotor magnetic poles of the brushless motor is P, in a case where a motor current reaches a predetermined threshold value, the electrical advance angle is increased within a range satisfying θ<360°/P.

4. The electric tool according to claim 1, wherein when the electrical advance angle of the brushless motor is θ and a number of rotor magnetic poles of the brushless motor is P, in a case where a motor current reaches a predetermined threshold value, the electrical advance angle is increased within a range satisfying θ<360°/P.

5. The electric tool according to claim 4, wherein in a case where the brushless motor is a three-phase brushless motor and the number P of the rotor magnetic poles is four, when the motor current reaches the predetermined threshold value, the electrical advance angle θ is set to 60°≤θ<90°.

6. The electric tool according to claim 1, wherein the brushless motor drives rotation of a circular saw blade.

7. The electric tool according to claim 1, wherein the controller determines a magnitude of the load according to a current flowing through the brushless motor.

8. The electric tool according to claim 1, wherein the controller increases the electrical advance angle when the load reaches a threshold value.

9. The electric tool according to claim 1, wherein when the load becomes large, the controller increases the electrical advance angle in a manner that the non-electrified period is not occurred.

10. An electric tool, comprising:
a brushless motor;
a housing that accommodates the brushless motor;
a controller that controls drive of the brushless motor; and
an inverter circuit that receives supply of a pulsation voltage obtained by full-wave rectifying an AC power supply input and electrifies the brushless motor according to a control signal of the controller,
wherein the controller is capable of changing an electrical advance angle of the brushless motor through a manual switching part,
wherein the controller increases the electrical advance angle when the load reaches a threshold value.

11. The electric tool according to claim 10, wherein the brushless motor drives rotation of a circular saw blade.

12. The electric tool according to claim 10, wherein the controller determines a magnitude of the load according to a current flowing through the brushless motor.

* * * * *